(12) United States Patent
Furukawa (10) Patent No.: US 12,301,028 B2
(45) Date of Patent: May 13, 2025

(54) BATTERY SYSTEM AND CONTROL METHOD

(71) Applicant: Prime Planet Energy & Solutions, Inc., Tokyo (JP)

(72) Inventor: Kimihiko Furukawa, Kakogawa (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 586 days.

(21) Appl. No.: 17/678,910

(22) Filed: Feb. 23, 2022

(65) Prior Publication Data

US 2022/0271540 A1 Aug. 25, 2022

(30) Foreign Application Priority Data

Feb. 25, 2021 (JP) ................ 2021-028180

(51) Int. Cl.
*H02J 7/00* (2006.01)
*H01M 10/42* (2006.01)
*H01M 10/44* (2006.01)

(52) U.S. Cl.
CPC ......... *H02J 7/0016* (2013.01); *H01M 10/425* (2013.01); *H01M 10/441* (2013.01)

(58) Field of Classification Search
CPC .... H02J 7/0016; H02J 7/0019; H02J 2310/48; H02J 7/0068; H02J 7/00714; H02J 7/007182; H01M 10/425; H01M 10/441; Y02E 60/10
USPC ........................................................ 320/126
See application file for complete search history.

(56) References Cited

U.S. PATENT DOCUMENTS

| 6,700,350 | B2 * | 3/2004 | Formenti | H02J 7/0016 320/119 |
| 10,259,337 | B2 * | 4/2019 | Alser | H02P 27/06 |
| 10,427,547 | B2 * | 10/2019 | Syouda | H02J 7/0042 |
| 10,530,165 | B2 * | 1/2020 | Lee | G01R 31/3648 |
| 10,894,484 | B2 * | 1/2021 | Han | B60L 53/67 |
| 11,251,629 | B2 * | 2/2022 | Fukushima | H01M 10/48 |

(Continued)

FOREIGN PATENT DOCUMENTS

| CA | 2908155 A1 * | 10/2014 | B60L 3/0046 |
| CN | 206231246 U * | 6/2017 | Y02T 10/70 |

(Continued)

OTHER PUBLICATIONS

Machine Translation of JP2001351696A (Year: 2001).*
Machine Translation of JP2022055173A (Year: 2022).*

*Primary Examiner* — M Baye Diao
(74) *Attorney, Agent, or Firm* — HAUPTMAN HAM, LLP (57) ABSTRACT

A battery system includes: a charging apparatus; a plurality of battery modules to connectable in parallel with the charging apparatus; and a controller, in which each of the plurality of battery modules has a battery, and the controller obtains, when a charging command is received, a voltage value of the battery of each of the plurality of battery modules, identifies a first battery having a lowest voltage value and a second battery having a second lowest voltage value, starts charging of the first battery, and after starting the charging of the first battery, starts charging of the second battery when a difference value between a voltage value of a first battery module and the voltage value of the second battery becomes equal to or less than a first threshold value.

7 Claims, 7 Drawing Sheets

(56) References Cited

U.S. PATENT DOCUMENTS

| | | | | |
|---|---|---|---|---|
| 11,843,267 B2* | 12/2023 | Ono | ................... | H01M 10/441 |
| 11,933,851 B2* | 3/2024 | Hyun | ................. | G01R 31/3648 |
| 2009/0033283 A1* | 2/2009 | Beg | ........................ | H02J 9/062 |
| | | | | 320/128 |
| 2012/0313439 A1 | 12/2012 | Yamaguchi et al. | | |
| 2017/0120772 A1* | 5/2017 | Alser | ..................... | H02J 7/0019 |
| 2018/0056798 A1* | 3/2018 | Syouda | ................... | B60L 58/15 |
| 2018/0228007 A1* | 8/2018 | Siefer | ..................... | H02J 9/065 |
| 2019/0322193 A1* | 10/2019 | Duan | ...................... | B60L 58/20 |

FOREIGN PATENT DOCUMENTS

| | | | | | |
|---|---|---|---|---|---|
| EP | 3758183 | A1 * | 12/2020 | .......... | H01M 10/425 |
| EP | 3974232 | A1 * | 3/2022 | ................ | B60L 1/14 |
| JP | 2001351696 | A  * | 12/2001 | ............. | Y02E 60/10 |
| JP | 3752943 | B2 * | 3/2006 | ........ | H03K 17/0822 |
| JP | 2011182623 | A | 9/2011 | | |
| JP | 201673021 | A | 5/2016 | | |
| JP | 2022055173 | A  * | 4/2022 | ................ | B60L 1/14 |

* cited by examiner

BATTERY SYSTEM AND CONTROL METHOD

This nonprovisional application is based on Japanese Patent Application No. 2021-028180 filed on Feb. 25, 2021 with the Japan Patent Office, the entire contents of which are hereby incorporated by reference.

BACKGROUND OF THE INVENTION

Field of the Invention

The present disclosure relates to a battery system and a control method.

Description of the Background Art

In recent years, demand for mobile bodies powered by electric power (for example, vehicles such as electric vehicles (EVs) or ships) has been increasing. An assembled battery system (hereinafter also referred to as a "battery system") used in such a mobile body employs a high-capacity configuration in which a plurality of assembled batteries (hereinafter also referred to simply as "batteries") are connected in parallel in order to allow long distance travel or navigation. The plurality of batteries are charged by a charging apparatus while the mobile body is parked or anchored, and are discharged to a propeller of the mobile body or to a load in the mobile body during travel or navigation.

A voltage difference may occur between the plurality of batteries due to characteristic variation of cells. When the plurality of batteries between which the voltage difference has occurred are connected in parallel, a so-called "cross current" is generated in which a current flows from a battery having a higher voltage value of the plurality of batteries to a battery having a lower voltage value.

Japanese Patent Laying-Open No. 2011-182623 proposes a battery system for preventing the generation of such a cross current. This battery system performs, when charging or discharging a plurality of batteries, for example, a process for equalizing voltages of the plurality of batteries. In this battery system, an equalizing resistor is provided between the batteries. The equalizing process is performed to pass a current from a battery having a higher voltage value to a battery having a lower voltage value through the equalizing resistor.

SUMMARY OF THE INVENTION

Unfortunately, in Japanese Patent Laying-Open No. 2011-182623, the need to include the equalizing resistor results in an increased size of the system. In addition, as a current that has passed through the resistor is used, the current decreases when the voltage difference is small, resulting in an extended time required for equalization.

An object of the present disclosure is to provide a battery system and a control method, in which voltage equalization between batteries is performed in a short amount of time without an increase in size of a battery system.

According to an aspect of the present disclosure, a battery system includes a charging apparatus, a plurality of battery modules connectable in parallel with the charging apparatus, and a controller. Each of the plurality of battery modules has a battery. When a charging command is received, the controller obtains a voltage value of the battery of each of the plurality of battery modules, and identifies a first battery having a lowest voltage value and a second battery having a second lowest voltage value. First, the controller starts charging of the first battery. Then, after starting the charging of the first battery, the controller starts charging of the second battery when a difference value between a voltage value of a first battery module including the first battery and the voltage value of the second battery, or a difference value between the voltage value of the first battery and the voltage value of the second battery becomes equal to or less than a first threshold value.

According to another aspect of the present disclosure, a battery system includes a load, a plurality of battery modules connectable in parallel with the load, and a controller. Each of the plurality of battery modules has a battery. When a discharging command is received, the controller obtains a voltage value of the battery of each of the plurality of battery modules, and identifies a first battery having a highest voltage value and a second battery having a second highest voltage value. First, the controller starts discharging of the first battery. Then, after starting the discharging of the first battery, the controller starts discharging of the second battery when a difference value between a voltage value of a first battery module including the first battery and the voltage value of the second battery, or a difference value between the voltage value of the first battery and the voltage value of the second battery becomes equal to or less than a first threshold value.

According to another aspect of the present disclosure, there is provided a method for controlling a battery system including a charging apparatus and a plurality of battery modules connectable in parallel with the charging apparatus. Each of the plurality of battery modules has a battery. In the control method, when a charging command is received, a voltage value of the battery of each of the plurality of battery modules is obtained, and a first battery having a lowest voltage value and a second battery having a second lowest voltage value are identified. First, in the control method, charging of the first battery is started. Then, in the control method, after the charging of the first battery is started, charging of the second battery is started when a difference value between a voltage value of a first battery module including the first battery and the voltage value of the second battery, or a difference value between the voltage value of the first battery and the voltage value of the second battery becomes equal to or less than a first threshold value.

According to another aspect of the present disclosure, there is provided a method for controlling a battery system including a load and a plurality of battery modules connectable in parallel with the load. Each of the plurality of battery modules has a battery. In the control method, when a discharging command is received, a voltage value of the battery of each of the plurality of battery modules is obtained, and a first battery having a highest voltage value and a second battery having a second highest voltage value are identified. First, in the control method, discharging of the first battery is started. Then, in the control method, after the discharging of the first battery is started, discharging of the second battery is started when a difference value between a voltage value of a first battery module including the first battery and the voltage value of the second battery, or a difference value between the voltage value of the first battery and the voltage value of the second battery becomes equal to or less than a first threshold value.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present disclosure will be described in detail hereinafter with reference to the drawings, in which the same or corresponding portions are denoted by the same reference characters and description thereof will not be repeated.

<Configuration Example of Battery System>

Figure 1:
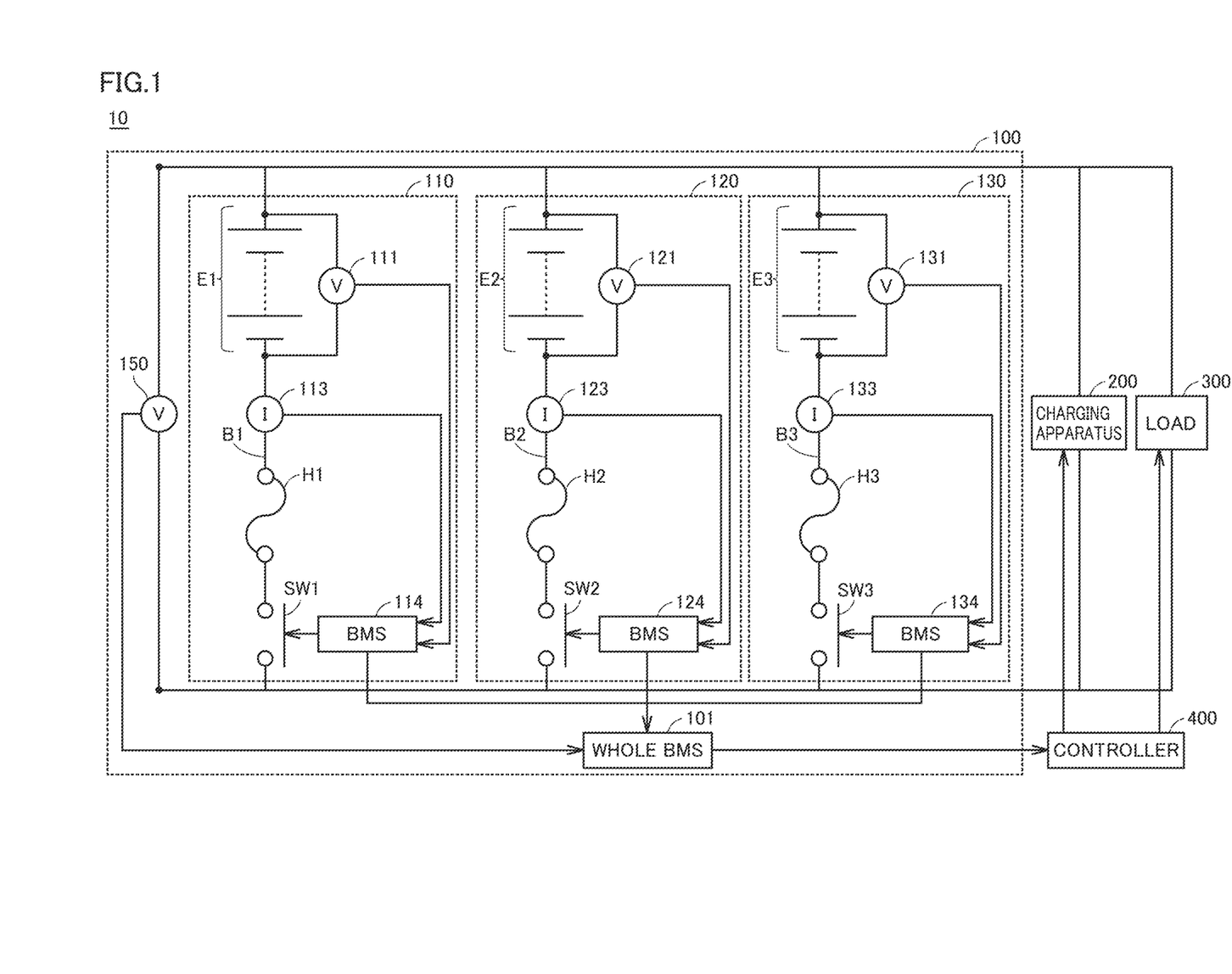
FIG. 1 shows a mounting example of a battery system.

FIG. 1 shows a mounting example of a battery system 100. Battery system 100 is mounted on a mobile body 10. Mobile body 10 is a ship, an electric vehicle or the like, which is powered by a high-capacity battery. Mobile body 10 includes battery system 100, a charging apparatus 200, a load 300 (for example, an inverter), and a controller 400. Load 300 may be a propeller, for example.

Battery system 100, charging apparatus 200 and load 300 are connected in the same circuit. Load 300 (for example, an inverter) converts a DC current supplied from battery system 100 into an AC current and supplies the AC current to a not-shown motor as electric power. Charging apparatus 200 supplies electric power to battery system 100 and charges battery system 100 that is a secondary battery.

Controller 400 is connected to battery system 100, charging apparatus 200 and load 300. Controller 400 can control charging to battery system 100 by controlling charging apparatus 200. Controller 400 can also control a value of a discharging current to load 300 by controlling load 300.

Battery system 100 includes N separate battery modules, where N is an integer greater than or equal to 2. In the present embodiment, N=3 is satisfied. That is, battery system 100 includes three battery modules. Battery system 100 includes a battery module 110, a battery module 120, a battery module 130, and a whole battery management system (BMS) 101. Battery module 110, battery module 120 and battery module 130 are each connected in parallel with charging apparatus 200 and load 300. In the following, each of battery module 110, battery module 120 and battery module 130 may be referred to as each of battery modules 110 to 130. Although battery module 110 is mainly described below, battery modules 120 and 130 are also similar in configuration to battery module 110.

Battery module 110 includes a battery E1, a bus bar B1, a fuse H1, a relay SW1, a voltage sensor 111, a current sensor 113, and a BMS 114. Battery module 120 includes a battery E2, a bus bar B2, a fuse H2, a relay SW2, a voltage sensor 121, a current sensor 123, and a BMS 124. Battery module 130 includes a battery E3, a bus bar B3, a fuse H3, a relay SW3, a voltage sensor 131, a current sensor 133, and a BMS 134. A relay is also referred to as a "connecting element."

Battery E1 is an assembled battery formed by connecting a plurality of single-cell batteries in series. In battery E1, 80 to 100 single-cell batteries are connected in series, for example. The single-cell battery is a secondary battery. The single-cell battery may be, for example, a lithium ion secondary battery, or a nickel-metal hydride secondary battery.

Bus bar B1 is an electrically conductive member for connecting battery E1, fuse H1 and relay SW1 to each other. Bus bar B1 may be provided in battery E1 in order to connect the plurality of single-cell batteries.

Fuse H1 prevents an overcurrent from flowing through battery module 110. When a current having a value higher than a permissible current value is passed through battery system 100, overdischarge protection such as fuses H1 to H3 works to interrupt the use of each of battery modules 110 to 130.

A voltage sensor detects a voltage value of a battery corresponding to this voltage sensor, and outputs the detected voltage value to a corresponding BMS. For example, voltage sensor 111 detects a voltage value V1 of battery E1 corresponding to voltage sensor 111. Voltage sensor 121 detects a voltage value V2 of battery E2 corresponding to voltage sensor 121. Voltage sensor 131 detects a voltage value V3 of battery E3 corresponding to voltage sensor 131.

A current sensor detects a value of a current flowing through a battery module corresponding to this current sensor, and outputs the detected current value to a corresponding BMS. For example, current sensor 113 detects a value I1 of a current flowing through battery module 110. Current sensor 123 detects a value I2 of a current flowing through battery module 120. Current sensor 133 detects a value I3 of a current flowing through battery module 130.

BMS 114 controls an ON state or an OFF state of relay SW1. When relay SW1 is in the ON state, charging by charging apparatus 200 is performed. When relay SW1 is in the ON state, discharging to load 300 is performed. When relay SW1 is in the OFF state, neither charging by charging apparatus 200 nor discharging to load 300 is performed.

BMS 114 obtains voltage value V1 from voltage sensor 111, and current value I1 from current sensor 113. BMS 114 can also obtain, through prescribed computation, a state of charge (SOC) of battery E1 and a resistance value (such as a resistance value r1 which will be described alter) of the battery module, for example.

A battery module includes a battery, and corresponding members corresponding to this battery. In the present embodiment, the corresponding members are a bus bar, a fuse, and a relay.

A whole voltage sensor 150 detects a whole voltage value Vc of the battery modules connected in parallel. Whole voltage sensor 150 outputs detected whole voltage value Vc to whole BMS 101. Whole BMS 101 obtains a parameter (such as a voltage value) obtained by each of BMSs 114, 124 and 134, and whole voltage value Vc from whole voltage sensor 150. Whole voltage sensor 150 may be implemented as an independent circuit, or as a partial function of each of BMSs 114, 124 and 134 or whole BMS 101. Whole BMS 101 also controls each of battery modules 110 to 130.

Although FIG. 1 illustrates the example in which battery modules 110 to 130 include BMSs 114 to 134, respectively, battery system 100 does not necessarily have to include BMSs 114 to 134. For example, the voltage sensor and the current sensor of each of battery modules 110 to 130 may be directly connected to whole BMS 101. Alternatively, battery system 100 does not necessarily have to include whole BMS 101. For example, a below-described process executed by whole BMS 101 may be executed by BMS 114.

BMSs 114, 124 and 134, controller 400, and whole BMS 101 are computing entities that execute various programs. Controller 400 and whole BMS 101 are each implemented by, for example, a central processing unit (CPU), a field-programmable gate array (FPGA), and a graphics processing unit (GPU).

BMSs 114, 124 and 134, controller 400, and whole BMS 101 each include a not-shown memory. The memory provides a storage area that temporarily stores a program code, a working memory and the like when whole BMS 101 executes an arbitrary control program. The memory is implemented by, for example, a volatile memory device (RAM) such as a dynamic random access memory (DRAM) or a static random access memory (SRAM).

BMSs 114, 124 and 134, controller 400, and whole BMS 101 each include a storage device such as a not-shown read only memory (ROM). The storage device such as a ROM provides a storage area that stores various types of programs and data required for a computing process and the like. The storage device such as a ROM is implemented by a non-volatile memory device such as a solid state drive (SSD), in addition to a normal non-rewritable memory.

A control program of at least one of BMSs 114, 124 and 134, controller 400, and whole BMS 101 may be provided by an information provider, as a program product that can be downloaded through the Internet, for example. The control program may be provided as stored in a storage medium. The storage medium stores a program in a non-transitory manner. The storage medium is a digital versatile disc (DVD)-ROM or a compact disc (CD)-ROM, for example.

Figure 2:
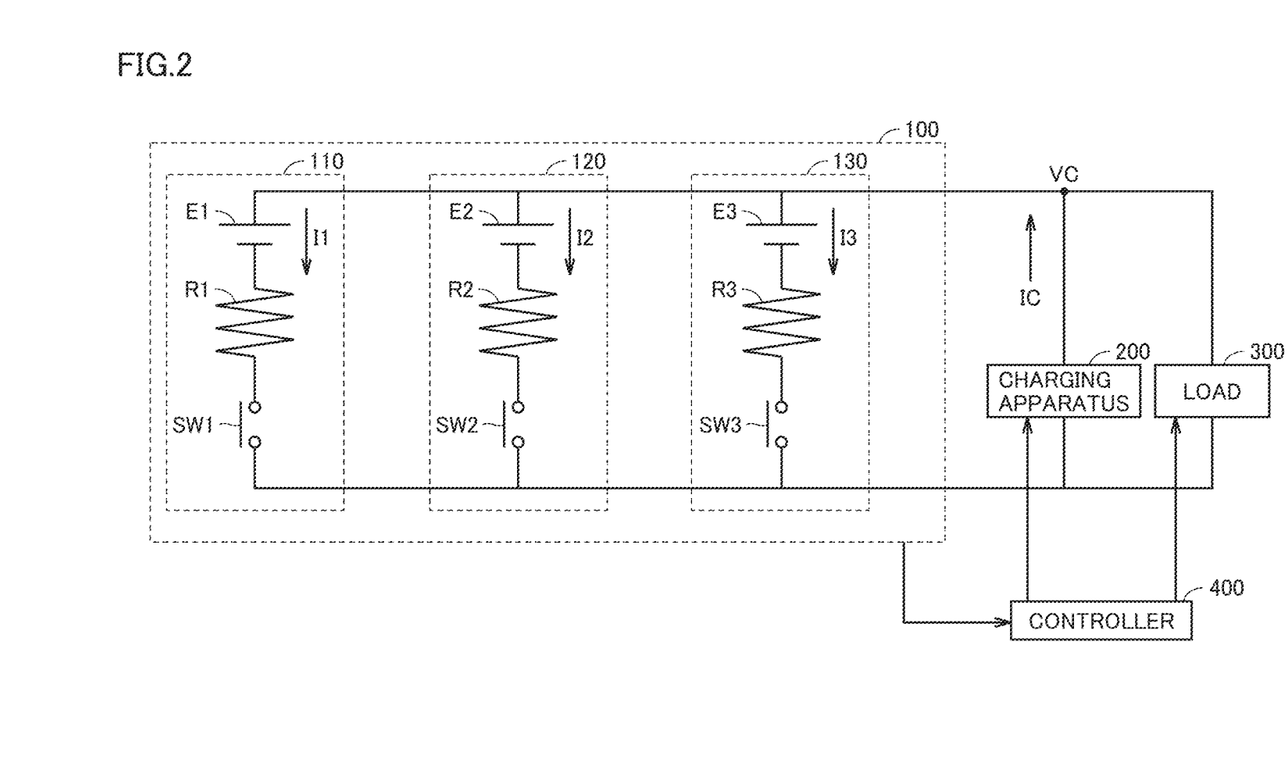
FIG. 2 is an equivalent circuit diagram of the battery system.

FIG. 2 is an equivalent circuit diagram of the battery system shown in FIG. 1. The example of FIG. 2 illustrates a combined resistance of "resistances of corresponding members included in a battery module" and "an internal resistance of a battery included in this battery module." For example, FIG. 2 illustrates a combined resistance R1 obtained by combining "resistances of corresponding members included in battery module 110" and "an internal resistance of battery E1 included in this battery module." FIG. 2 similarly illustrates combined resistances R2 and R3. A combined resistance value is a value obtained by, for example, adding resistance values of bus bar B1, fuse H1 and relay SW1 to an internal resistance value of battery E1.

Resistances R1, R2 and R3 have resistance values r1, r2 and r3, respectively. Resistance values r1, r2 and r3 are detected by BMSs 114, 124 and 134, respectively. Voltage values V1, V2 and V3 are detected by voltage sensors 111, 121 and 131, respectively. Voltage value Vc is detected by whole voltage sensor 150. Current values I1, I2 and I3 are detected by current sensors 113, 123 and 133, respectively. A current value Ic is a value of a charging current supplied by charging apparatus 200.

[Charging Process]

Figure 3:
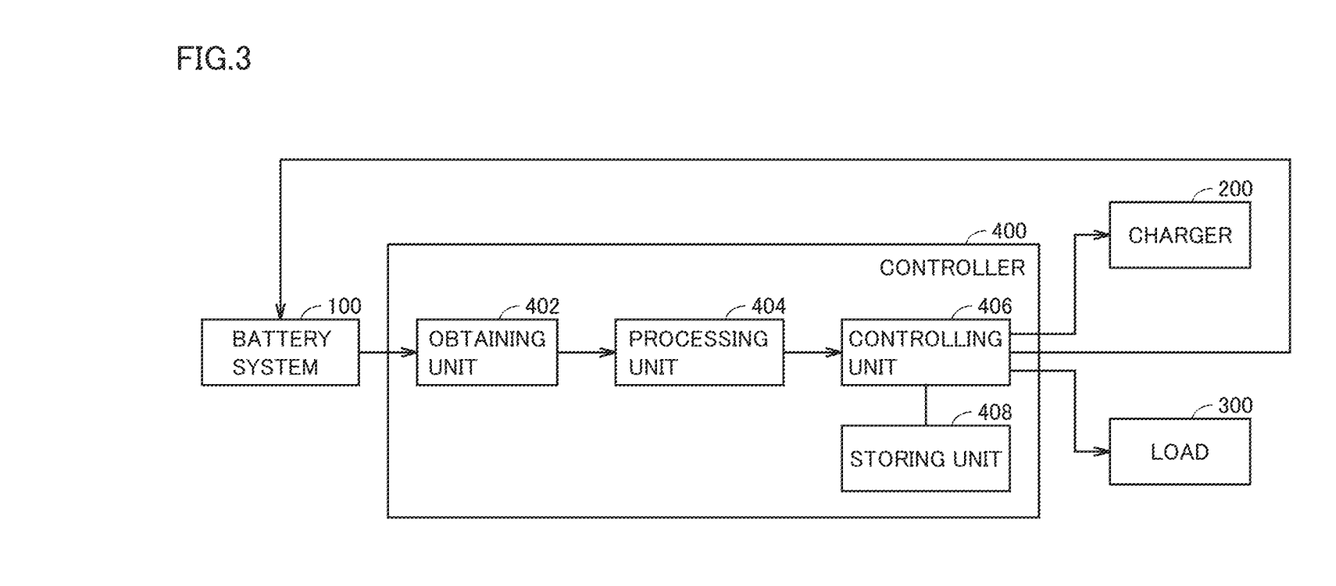
FIG. 3 is a functional block diagram of a controller in the present embodiment.

A charging process is now described. FIG. 3 is a functional block diagram of controller 400 in the present embodiment. Controller 400 includes an obtaining unit 402, a processing unit 404, a controlling unit 406, and a storing unit 408.

When a charging command (charging command signal) is received, controller 400 starts a charging process. The charging command signal is a signal indicating a start of charging by charging apparatus 200. The charging command is transmitted, for example, from an apparatus (not shown) different from controller 400 to controller 400. When a discharging command (discharging command signal) is received, controller 400 starts a discharging process. The discharging command signal is a signal indicating a start of discharging to load 300. The discharging command is transmitted, for example, from an apparatus (not shown) different from controller 400 to controller 400.

Obtaining unit 402 obtains a plurality of parameters from battery system 100 (or whole BMS 101). The plurality of parameters are, for example, voltage values V1, V2, V3 and Vc, current values I1, I2 and I3, and resistance values r1, r2 and r3. Obtaining unit 402 outputs the plurality of parameters to processing unit 404.

Processing unit 404 compares voltage values V1, V2 and V3, and identifies an order of voltage values. Processing unit 404 then identifies a battery having the lowest voltage value (hereinafter also referred to as a "first battery"), a battery having the second lowest voltage value (hereinafter also referred to as a "second battery"), and a battery having the third lowest voltage value (that is, a battery having the highest voltage value; also referred to as a "third battery"). A battery module including the first battery is referred to as a first battery module (that is, battery module 110), a battery module including the second battery is referred to as a second battery module (that is, battery module 120), and a battery module including the third battery is referred to as a third battery module (that is, battery module 130). In the present embodiment, the first battery is battery E1, the second battery is battery E2, and the third battery is battery E3 In other words, V1<V2<V3 is satisfied. Processing unit 404 outputs a result of the identification to controlling unit 406.

Controlling unit 406 starts charging of battery E1 having the lowest voltage value. Specifically, controller 400 switches relay SW1 corresponding to battery E1 to the ON state. Additionally, controller 400 causes charging apparatus 200 to start to output the charging current.

As a result, voltage value V1 and voltage value Vc increase gradually. A relationship between Vc and V1 is expressed by the following equation (1):

$$Vc = V1 + I1 \times r1 \tag{1}$$

Then, when a difference value between voltage value Vc and voltage value V2 becomes equal to or less than a first threshold value, charging to battery E2 is started while the charging to battery E1 is continued. Specifically, controller 400 switches relay SW2 corresponding to battery E2 to the ON state. The first threshold value may be zero, or a real number greater than zero. The first threshold value is stored in storing unit 408. The first threshold value will be described later.

After the charging to battery E2 is started, voltage value V1, voltage value V2 and voltage value Vc increase gradually. When relay SW2 is switched to the ON state, charging current Ic is divided into current I1 and current I2. However, as battery E2 has a higher SOC than battery E1, a higher amount of charging current flows to battery E1. Accordingly, the SOC of battery E1 reaches the SOC of battery E2.

Then, when a difference value between voltage value Vc and voltage value V3 becomes equal to or less than a second threshold value, charging to battery E3 is started while the charging to battery E1 and battery E2 is continued. Specifically, controller 400 switches relay SW3 corresponding to battery E3 to the ON state. Then, when the charging of all batteries E1 to E3 is completed, controller 400 ends the charging process. The end of charging of a battery means, for example, that the battery has been fully charged. Controller 400 determines, when the SOCs of batteries E1 to E3 reach their target values (when batteries E1 to E3 are fully charged), for example, that the charging of all batteries E1 to E3 has been completed. The first threshold value and the second threshold value may be the same as or different from each other. The present embodiment employs a configuration in which the second threshold value is the same as the first threshold value.

In the present embodiment, controller 400 performs constant-current charging until any of the batteries is fully charged. When any of the batteries is fully charged, controller 400 switches the constant-current charging to constant-voltage charging.

The first threshold value is now described. The first threshold value is a value which is set so that there is no or little adverse effect on battery system 100 even when a cross current is generated while a relay is controlled to be in the ON state. The first threshold value is typically calculated based on a resistance value of a battery module, and a value Ix of a maximum current permitted to flow through battery system 100. Maximum current value Ix is a value predetermined by experiment, for example. The first threshold value is calculated from the following equation (2), for example:

First threshold value=Resistance value×Maximum current value Ix     (2)

When resistance values r1, r2 and r3 of the respective battery modules are 0.05Ω and maximum current value Ix is 100 A, for example, the first threshold value is 5 V (=100× 0.05) from the above equation (2). The manner of determining the first threshold value is merely exemplary, and other values may be employed. The first threshold value may be a value smaller than the value calculated from the right-hand side of the equation (2). The first threshold value may be calculated when controller 400 receives the charging command. The first threshold value may be a fixed value. The second threshold value may be determined with the same method as the first threshold value, or with a different method.

For example, the configuration example described in aforementioned Japanese Patent Laying-Open No. 2011-182623 (hereinafter also referred to as a "comparative example") includes an equalizing resistor for preventing a cross current. However, the inclusion of such a resistor results in an increased size of a battery system.

Accordingly, controller 400 of battery system 100 in the present embodiment obtains voltage values of the plurality of batteries, and identifies first battery E1 having the lowest voltage value and second battery E2 having the second lowest voltage value. Controller 400 then starts charging of first battery E1 by controlling relay SW1 corresponding to first battery E1 to be in the ON state. After the charging of first battery E1 is started, it is determined whether or not the difference value between voltage value Vc of first battery module 110 including first battery E1 and voltage value V2 of second battery E2 has become equal to or less than the first threshold value. When the difference value becomes equal to or less than the first threshold value, charging of second battery E2 is started by controlling relay SW2 corresponding to second battery E2 to be in the ON state. Therefore, battery system 100 in the present embodiment can charge first battery E1 and second battery E2 without including an equalizing resistor.

When relay SW2 is controlled to be in the ON state, a cross current may be generated. When relay SW2 is controlled to be in the ON state, however, the difference value has become equal to or less than the first threshold value. Therefore, battery system 100 allows there to be no or little adverse effect on battery system 100 even when a cross current is generated. Thus, the voltages of the batteries can be equalized without the need for an equalizing resistor, and thus without an increase in size of battery system 100. As a result, charging of the batteries can be appropriately performed in battery system 100. Moreover, in the comparative example, as a current that has passed through the equalizing resistor is used, the current decreases when the voltage difference is small, resulting in an extended time required for equalization. In contrast, in battery system 100 of the present embodiment, the time required for equalization can be shortened because there is no such equalizing resistor. Moreover, in the comparative example, the value of the current flowing through the equalizing resistor increases when the voltage difference between the batteries is large, resulting in increased heat generated by the equalizing resistor. In contrast, in battery system 100 of the present embodiment, the occurrence of such a problem can be prevented because there is no such equalizing resistor.

The first threshold value is calculated based on, for example, the resistance value of the first battery module, and value Ix of the maximum current permitted to flow between the first battery module and the second battery module including the second battery (see the above equation (2)). Therefore, an appropriate first threshold value is calculated based on the resistance value and the permissible current value.

The resistance value of the first battery module is, for example, a combined value of the internal resistance value of first battery E1 and the resistance values of the corresponding components of first battery E1 (the corresponding components included in the first battery module). Therefore, battery system 100 can determine a first threshold value reflecting the internal resistance value of first battery E1 and the resistance values of the corresponding components of first battery E1.

[Flowchart of Charging Process]

Figure 4:
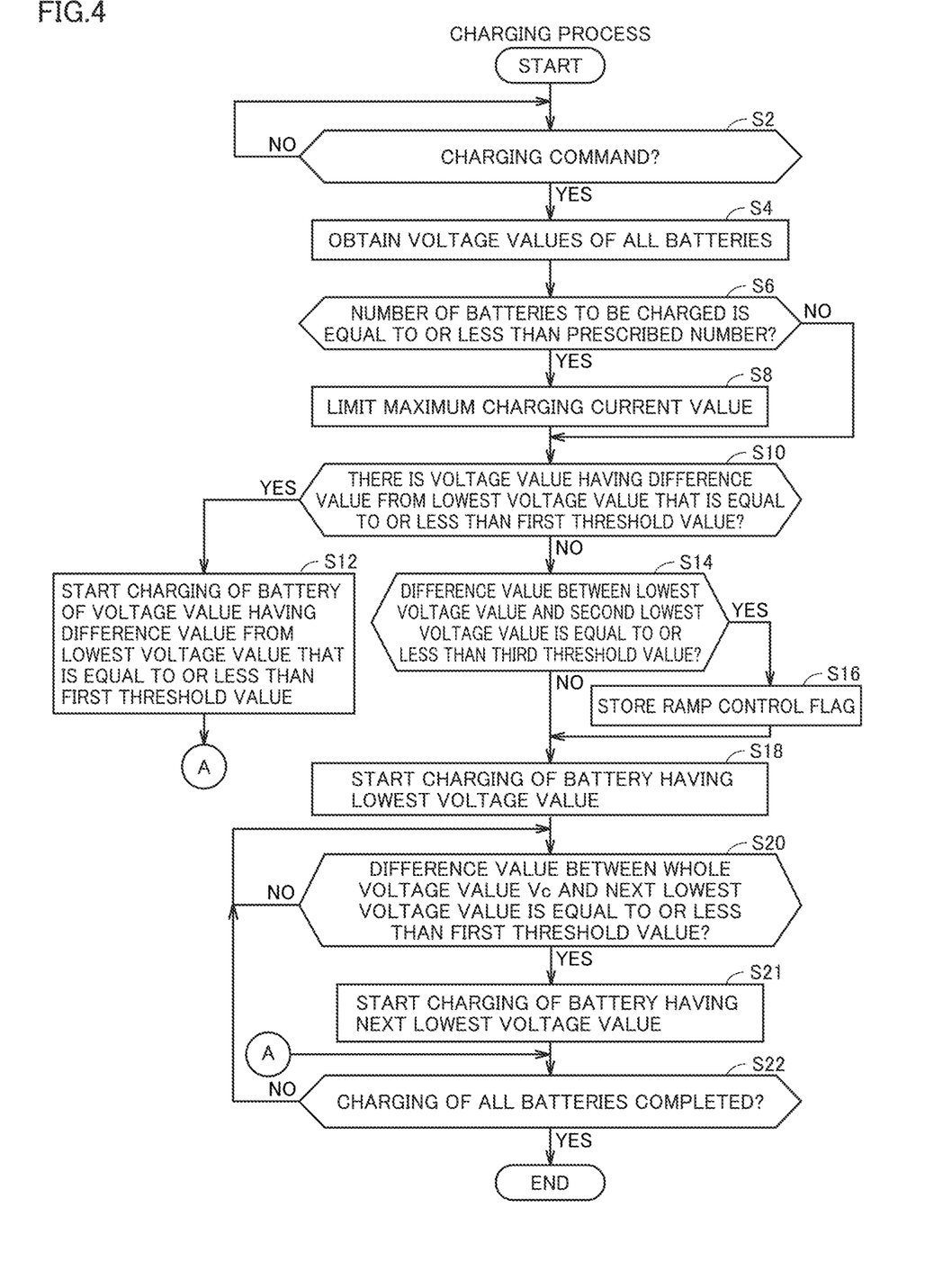
FIG. 4 is a flowchart showing a charging process of the controller.

FIG. 4 is a flowchart showing the charging process of controller 400. In step S2, controller 400 determines whether or not a charging command has been received. Controller 400 waits until the charging command is received (NO in step S2). When controller 400 receives the charging command (YES in step S2), the process proceeds to step S4.

In step S4, controller 400 obtains voltage values V1, V2 and V3 of all the batteries (batteries E1, E2 and E3 in the present embodiment). Then, in step S6, controller 400 calculates a number of batteries to be charged. Here, the battery to be charged refers to a battery that has not been fully charged, for example, a battery having a voltage value less than an upper limit value. The upper limit value is a predetermined value. The battery to be charged may be determined based on another parameter (for example, the SOC) and the like.

Controller 400 determines whether or not the number of batteries to be charged is equal to or less than a prescribed value. When the number of batteries is three as in the present embodiment, for example, the prescribed number is set to one. When the number of batteries to be charged is greater than the prescribed number (NO in step S6), the process proceeds to step S10.

When it is determined that the number of batteries to be charged is equal to or less than the prescribed number (YES in step S6), on the other hand, controller 400 limits a maximum charging current value in step S8. The maximum charging current value not limited by charging apparatus 200 is indicated by "Am," and the maximum charging current value limited in step S8 is indicated by "Am1," where Am1 is a smaller value than Am. For example, controller 400 transmits a limitation signal to charging apparatus 200. When the limitation signal is received, charging apparatus 200 changes the maximum charging current value from Am to Am1 based on the limitation signal. When the process of step S8 ends, the process proceeds to step S10.

In step S10, controller 400 refers to all the voltage values obtained, and detects the lowest voltage value (the voltage value of battery E1 described above). Controller 400 then determines whether or not there is a voltage value having a difference value from the lowest voltage value that is equal to or less than the first threshold value. When there is a voltage value having a difference value from the lowest voltage value that is equal to or less than the first threshold value (YES in step S10), the process proceeds to step S12.

When there is a voltage value having a difference value from the lowest voltage value that is equal to or less than the first threshold value (YES in step S10), the process proceeds to step S12. In step S12, controller 400 simultaneously starts charging of a battery having the lowest voltage value, and of a battery of the voltage value having a difference value from the lowest voltage value that is equal to or less than the first threshold value. Here, "simultaneously" includes "substantially simultaneously" as well. In the example described in FIG. 2, for example, when the charging command is received, and when the difference value between first battery E1 and second battery E2 is already equal to or less than the first threshold value, charging of first battery E1 and second battery E2 is simultaneously started. When the process of step S12 ends, the process proceeds to step S22.

When the determination is NO in step S10, in step S14, controller 400 determines whether or not a difference value between the lowest voltage value and the second lowest voltage value is equal to or less than a third threshold value. The third threshold value is a value greater than the first threshold value and the second threshold value, and is a predetermined value. When the difference value between the lowest voltage value and the second lowest voltage value is equal to or less than the third threshold value (YES in step S14), the process proceeds to step S16. In step S16, controller 400 stores a ramp control flag. The ramp control flag is a flag indicating execution of ramp charging control. The ramp charging control is control of, for example, gradually increasing the charging current of charging apparatus 200, to increase the voltage value of the first battery module or the voltage value of the first battery linearly (as a linear function). With this control, charging of first battery E1 can be started in such a manner that the voltage value of the first battery module (whole voltage value Vc) does not exceed voltage value V2 of second battery E2 from the very start of charging. Stated another way, with this control, charging of first battery E1 can be started in such a manner that the voltage value of the first battery module (whole voltage value Vc) does not reach voltage value V2 of second battery E2 until the elapse of a prescribed period of time since the reception of the charging command. The ramp charging control will be described later. After the process of step S16 ends, and when the determination is NO in step S14, the process proceeds to step S18.

In step S18, controller 400 starts charging of the battery having the lowest voltage value (for example, first battery E1). When the ramp control flag has not been stored, in step S18, controller 400 causes the battery having the lowest voltage value to be charged by normal control which will be described later. When the ramp charging control flag is stored in step S16, on the other hand, in step S18, controller 400 starts charging of the battery having the lowest voltage value from a small charging current through the ramp charging control.

Then, in step S20, controller 400 determines whether or not a difference value between whole voltage value Vc and the next lowest voltage value (for example, voltage value V2 of second battery E2) has become equal to or less than the first threshold value. The charging of first battery E1 leads to an increase in voltage value V1 of first battery E1, and also to an increase in whole voltage value Vc. Then, in step S20, controller 400 waits until the difference value between whole voltage value Vc and voltage value V2 becomes equal to or less than the first threshold value (NO in step S20).

When the determination is YES in step S20, in step S21, controller 400 starts charging of a battery having the next lowest voltage value (for example, voltage value V2 of second battery E2). Then, in step S22, controller 400 determines whether or not charging of all the batteries has been completed. When charging of all the batteries has been completed, the charging process ends. When the determination is NO in step S22, on the other hand, the process returns to step S20. Subsequently, the process of step S20 and the process of step S21 are repeated until charging of all the batteries is completed (until the determination is YES in step S22).

As described above, controller 400 can appropriately perform charging of all the batteries (battery E1 to battery E3) by repeating the processes of step S20, step S21 and step S22, without including an equalizing resistor.

When the charging command is received (YES in step S2), and when the difference value is already equal to or less than the first threshold value (YES in step S10), controller 400 starts charging of first battery E1 and charging of second battery E2 (step S12). With such a configuration, controller 400 can shorten the charging time.

When the number of batteries to be charged by charging apparatus 200 of the plurality of batteries (the N batteries) is equal to or less than the prescribed number (YES in step S6), controller 400 limits the charging current by controller 400 (step S8). If the number of batteries to be charged is small, charging of those batteries with a large charging current may result in a permissible current of the batteries being exceeded. Accordingly, in the present embodiment, when the number of batteries to be charged is small, controller 400 limits the charging current. Therefore, the permissible current of the batteries to be charged is not exceeded.

[Experimental Results of Charging Process]

Figure 5:
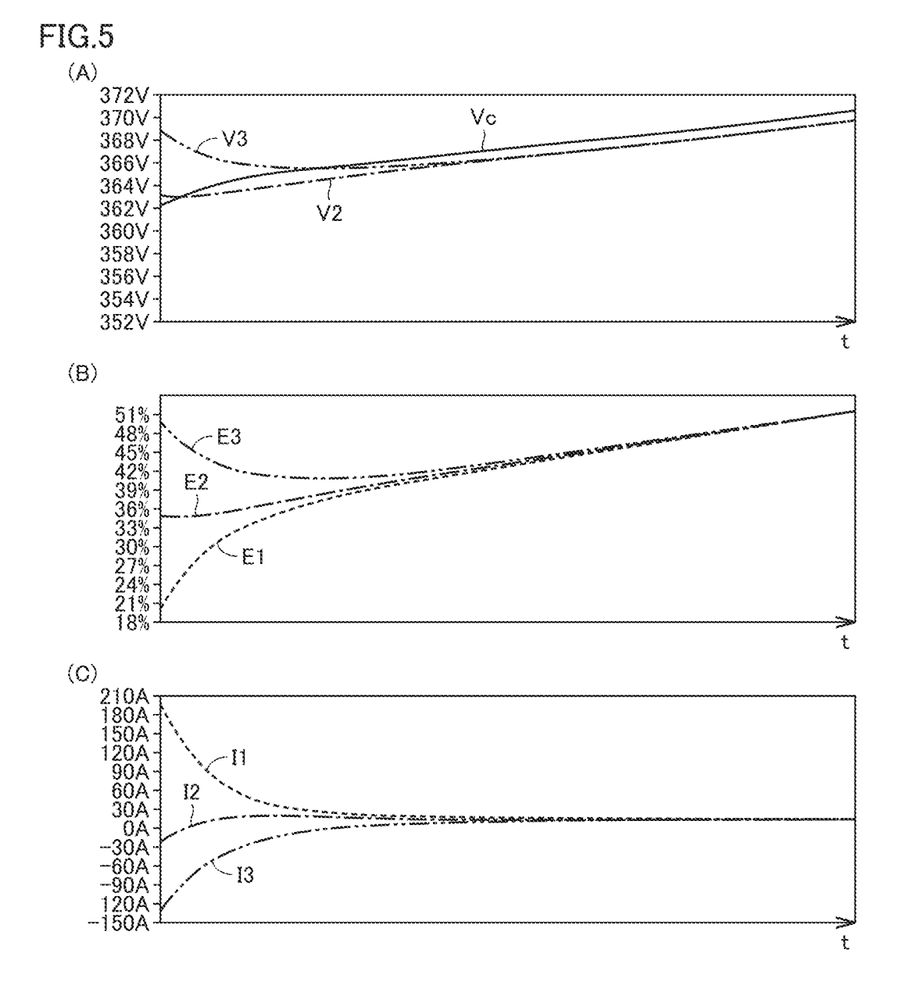
FIG. 5 shows experimental results in a comparative example.
Figure 6:
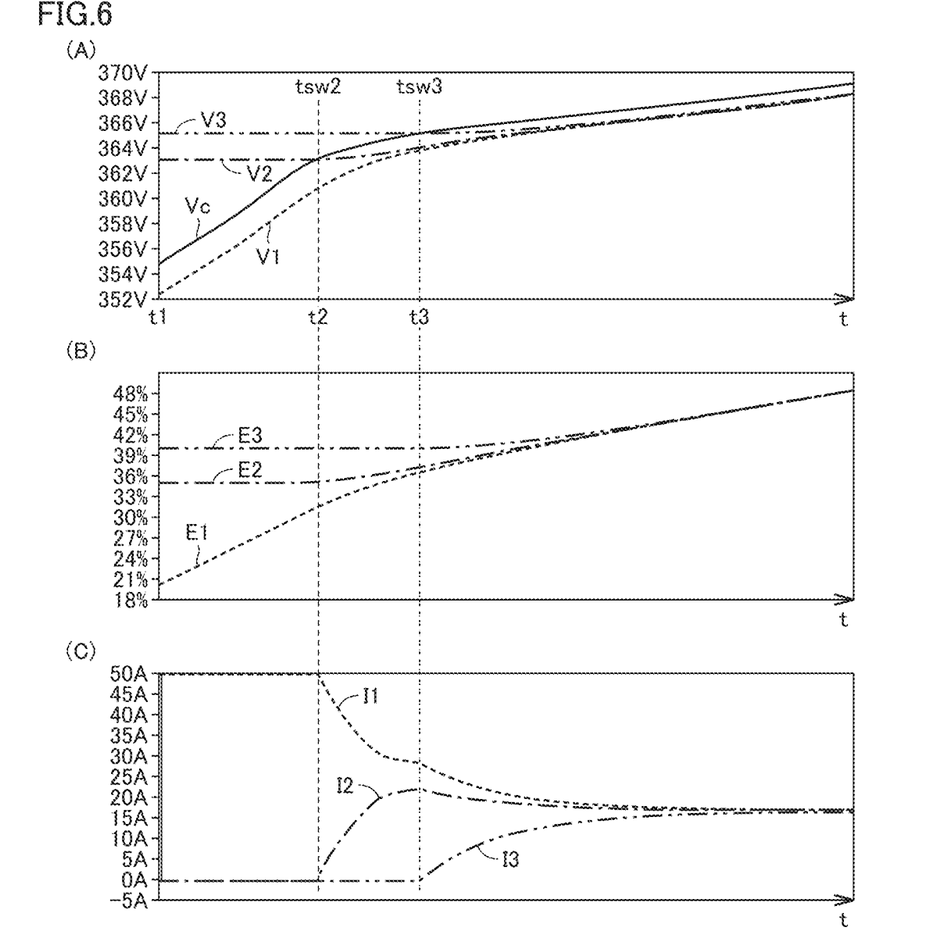
FIG. 6 shows experimental results of the battery system in the present embodiment.

Experimental results of the charging process of battery system 100 in the present embodiment are now described. FIG. 5 shows experimental results in the comparative example. FIG. 6 shows experimental results of battery system 100 in the present embodiment. The circuit configuration in the example of FIG. 2 applies to both FIGS. 5 and 6. In the comparative example, when the controller of the battery system receives a charging command, charging of batteries E1 to E3 is simultaneously started.

The horizontal axis represents a time axis in FIGS. 5(A) to 5(C) and FIGS. 6(A) to 6(C). In FIGS. 5 and 6, graphs associated with battery E1 are shown by dashed lines, graphs associated with battery E2 are shown by chain-dotted lines, graphs associated with battery E3 are shown by chain-double-dotted lines, and graphs associated with whole voltage value Vc are shown by solid lines. FIGS. 5(A) and 6(A) show voltage values. FIG. 5(A) shows voltage values V2, V3 and whole voltage value Vc, but does not show voltage value V1. FIGS. 5(B) and 6(B) show the SOC of each battery. FIGS. 5(C) and 6(C) show values of currents flowing through wires in the battery systems.

In the comparative example, the SOCs of batteries E1, E2 and E3 before being charged are 20%, 35% and 50%, respectively. In the present embodiment, the SOCs of batteries E1, E2 and E3 before being charged are 20%, 35% and 40%, respectively. Resistance values r1 to r3 are 0.5Ω, and the charging current by charging apparatus 200 is 50 A.

First, the battery system in the comparative example is described with reference to FIG. 5. In the comparative example, when charging to battery E1 to battery E3 is simultaneously started, voltage value V1 and voltage value V2 increase gradually by the same value as shown in FIG. 5(A). Whole voltage value Vc increases gradually by a value that is greater than this same value by a prescribed value.

In FIG. 5(B), the SOCs of battery E1 to battery E3 become equal in value and increase gradually. As shown in FIG. 5(C), current value I1 is as high as about 190 A when the charging command is received. The reason for such a high current value is that a cross current has been generated from battery E2 and battery E3 to battery E1.

Next, battery system 100 in the present embodiment is described with reference to FIG. 6. In the example of FIG. 6, the first threshold value is set to zero. In FIG. 6(A), at timing t1 when controller 400 receives the charging command, controller 400 starts charging of battery E1 (see step S18 of FIG. 4). When the charging is started, voltage value V1 and whole voltage value Vc increase gradually. Then, at timing t2 when whole voltage value Vc reaches the next lowest voltage value V2 (timing when the determination is YES in step S20 of FIG. 4), controller 400 starts charging of battery E2 (see step S21 of FIG. 4).

When the charging of second battery E2 is started, not only voltage value V1 but also voltage value V2 and whole voltage value Vc increase gradually. Then, at timing t3 when whole voltage value Vc reaches the next lowest voltage value V3 (timing when the determination is YES in step S20 of FIG. 4), controller 400 starts charging of battery E3 (see step S21 of FIG. 4). Subsequently, when the SOCs of all batteries E1 to E3 and the like reach a charging end value, the charging process ends.

The ramp control flag mentioned in step S16 of FIG. 4 is now described. Controller 400 causes first battery E1 to be charged so as to perform control of increasing whole voltage value Vc by a prescribed amount at timing t1 (hereinafter referred to as "normal control"), as shown at timing t1 in FIG. 6. The prescribed amount is about 3 V in the example of FIG. 4. Controller 400 can shorten the charging time by performing the normal control at timing t1.

However, if controller 400 performs the normal control when the difference value between whole voltage value Vc and voltage value V2 is greater than the first threshold value but is equal to or less than the third threshold value (NO in step S10 and YES in step S14), whole voltage value Vc exceeds voltage value V2 at timing t1, possibly resulting in failure to "connect batteries while suppressing the generation of a cross current."

Accordingly, in the present embodiment, when the difference value between whole voltage value Vc and voltage value V2 is greater than the first threshold value but is equal to or less than the third threshold value, the ramp control flag is set (step S16). Then, in step S18, controller 400 performs the ramp charging control of gradually increasing the charging current. Voltage value V1 of first battery E1 thereby increases gradually, thus allowing to connect batteries while suppressing the generation of a cross current.

Figure 7:
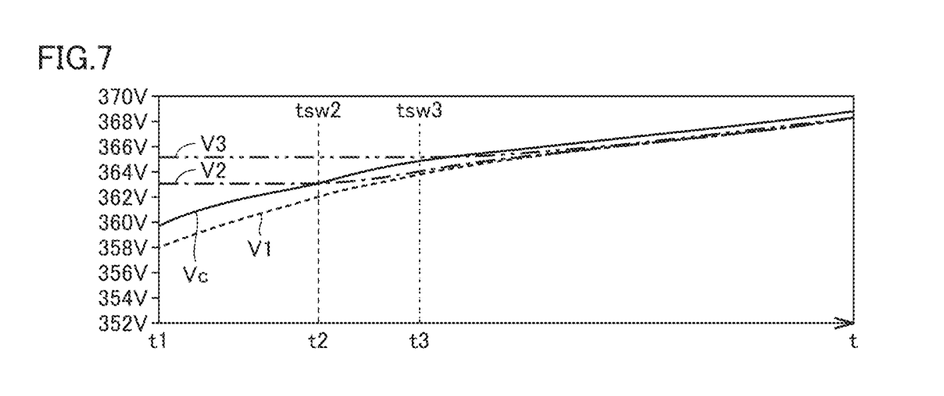
FIG. 7 shows an example where ramp charging control was performed.

FIG. 7 shows an example where the ramp charging control was performed. As shown in FIG. 7, because the ramp charging control was performed, the voltage value of the first battery module (or whole voltage value Vc) does not reach voltage value V2 of second battery E2 until the elapse of a prescribed period of time. The prescribed period of time is a predetermined period of time.

[Discharging Process]

A discharging process by battery system 100 in the present embodiment is now described. As described above, when controller 400 receives a charging command, charging to the batteries is performed successively from a battery having a lower voltage value. In the discharging process, discharging from the batteries to load 300 is performed successively from a battery having a higher voltage value. The generation of a cross current can thereby be reduced.

Figure 8:
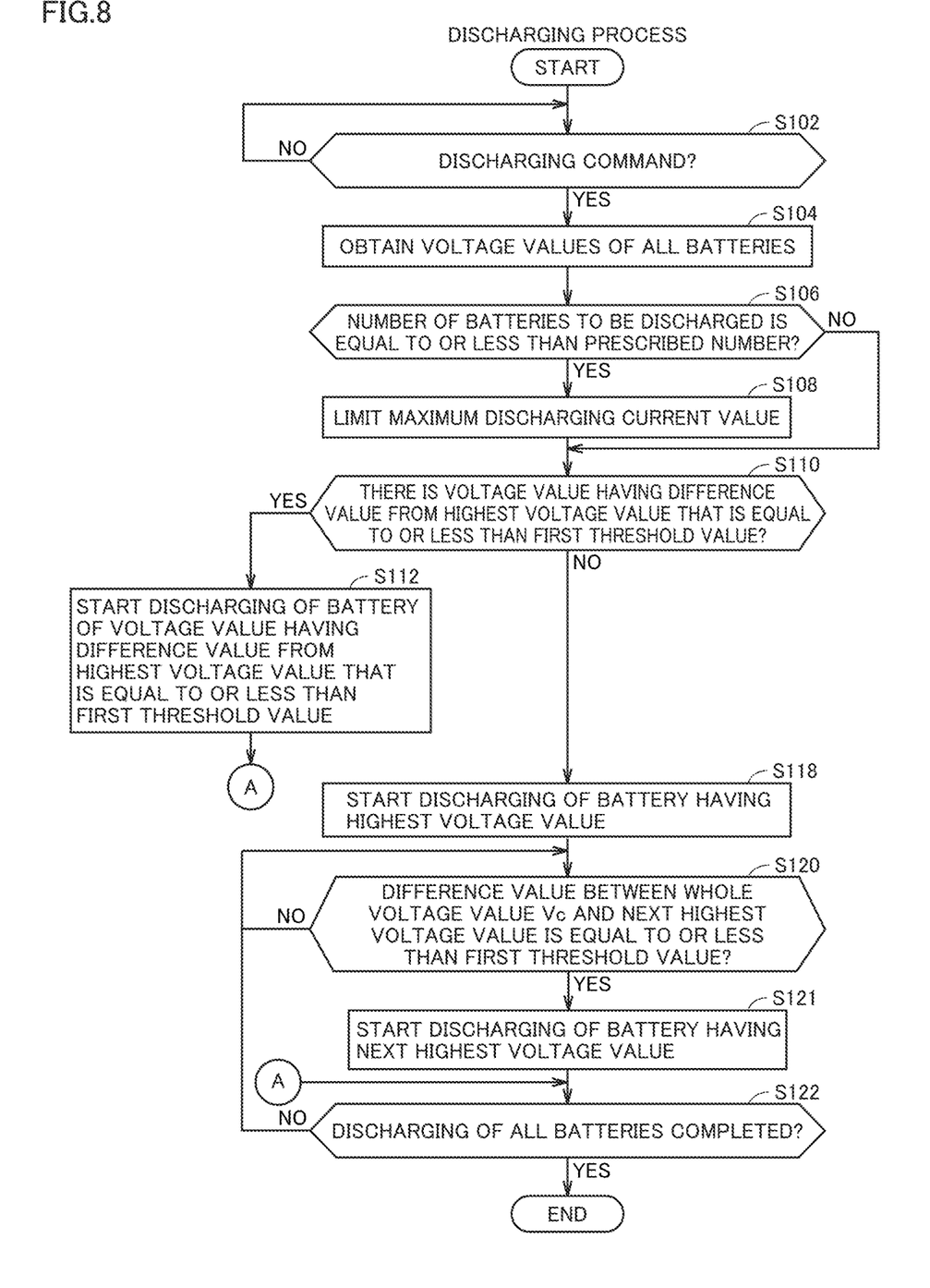
FIG. 8 is a flowchart showing a discharging process of the controller.

FIG. 8 is a flowchart showing the discharging process of controller 400. In step S102, controller 400 determines whether or not a discharging command has been received. Controller 400 waits until the discharging command is received (NO in step S102). When controller 400 receives the discharging command (YES in step S102), the process proceeds to step S104.

In step S104, controller 400 obtains voltage values V1, V2 and V3 of all the batteries (batteries E1, E2 and E3 in the present embodiment). Then, in step S106, controller 400 calculates a number of batteries that can be discharged. Here, the battery to be discharged refers to, for example, a battery having a voltage value greater than a lower limit value at which the battery can be discharged to load 300. The battery to be discharged may be determined based on another parameter (for example, the SOC) and the like.

Controller 400 determines whether or not the number of batteries to be discharged is equal to or less than a prescribed value. When the number of batteries is three as in the present embodiment, for example, the prescribed number is set to one. When the number of batteries to be discharged is greater than the prescribed number (NO in step S106), the process proceeds to step S110.

When it is determined that the number of batteries to be discharged is equal to or less than the prescribed number (YES in step S106), on the other hand, controller 400 limits a maximum discharging current value in step S108. The maximum discharging current value not limited by load 300 is indicated by "Bm," and the maximum discharging current value limited in step S108 is indicated by "Bm1," where Bm1 is a smaller value than Bm. For example, controller 400 transmits a limitation signal to load 300. When the limitation signal is received, load 300 reduces a current value required by load 300 based on the limitation signal. For example, load 300 changes the maximum discharging current value from Bm to Bm1. When the process of step S108 ends, the process proceeds to step S110.

In step S110, controller 400 refers to all the voltage values obtained, and detects the highest voltage value (the voltage value of battery E3 described above). Controller 400 then determines whether or not there is a voltage value having a difference from the highest voltage value that is equal to or less than the first threshold value. When there is a voltage value having a difference from the highest voltage value that is equal to or less than the first threshold value (YES in step S110), the process proceeds to step S112.

In step S112, controller 400 simultaneously starts discharging of a battery having the highest voltage value, and of a battery of the voltage value having a difference from the highest voltage value that is equal to or less than the first threshold value. Here, "simultaneously" includes "substantially simultaneously" as well. In the example described in FIG. 2, for example, when the discharging command is received, and when the difference value between third battery E3 and second battery E2 is already equal to or less than the first threshold value, discharging of third battery E3 and second battery E2 is simultaneously started. When the process of step S112 ends, the process proceeds to step S122.

When the determination is NO in step S110, in step S118, controller 400 starts discharging of the battery having the highest voltage value (for example, third battery E3). Then, in step S120, controller 400 determines whether or not a difference value between whole voltage value Vc and the next highest voltage value (for example, voltage value V2 of second battery E2) has become equal to or less than the first threshold value. The discharging of third battery E3 leads to a decrease in voltage value V3 of third battery E3, and also to a decrease in whole voltage value Vc. Then, in step S120, controller 400 waits until the difference value between whole voltage value Vc and voltage value V2 becomes equal to or less than the first threshold value (NO in step S120).

When the determination is YES in step S120, in step S121, controller 400 starts discharging of a battery having the next highest voltage value determined in step S120. Then, in step S122, controller 400 determines whether or not discharging of all the batteries has been completed. When discharging of all the batteries has been completed (YES in step S122), the discharging process ends. When the determination is NO in step S122, on the other hand, the process returns to step S120. Subsequently, the process of step S120 and the process of step S121 are repeated until discharging of all the batteries is completed (until the determination is YES in step S122). In this manner, battery system 100 repeats the processes of step S120, step S121 and step S122.

As described above, battery system 100 allows there to be no or little adverse effect on battery system 100 even when a cross current is generated during the discharging process. Thus, the voltages of the batteries can be equalized without the need for an equalizing resistor, and thus without an increase in size of battery system 100. As a result, discharging of the batteries can be appropriately performed in battery system 100. Moreover, in the comparative example, as a current that has passed through the equalizing resistor is used, the current decreases when the voltage difference is small, resulting in an extended time required for equalization. In contrast, in battery system 100 of the present embodiment, the time required for equalization can be shortened because there is no such equalizing resistor. Moreover, in the comparative example, the value of the current flowing through the equalizing resistor increases when the voltage difference between the batteries is large, resulting in increased heat generated by the equalizing resistor. In contrast, in battery system 100 of the present embodiment, the occurrence of such a problem can be prevented because there is no such equalizing resistor.

When the discharging command is received (YES in step S102), and when the difference value is already equal to or less than the first threshold value (YES in step S110), controller 400 starts discharging of first battery E1 and discharging of second battery E2 (step S112). With such a configuration, controller 400 can collectively supply a large amount of power to load 300.

When the number of batteries to be discharged to load 300 of the plurality of batteries (the N batteries) is equal to or less than the prescribed number (YES in step S106), controller 400 limits the discharging current to load 300 (step S108). If the number of batteries to be discharged is small, there may not be a sufficient amount of power to load 300, resulting in failure to appropriately control mobile body 10. Accordingly, controller 400 transmits a limitation signal to load 300. This allows load 300 to recognize in advance that there is only a small amount of power to be supplied to load 300. Thus, load 300 can control mobile body 10 with this small amount of power.

[Other Embodiments]

(1) In the charging process of the embodiment described above, the configuration in which the difference value is "a difference value between 'whole voltage value Vc' and 'the next lowest voltage value'" has been described, as was mentioned in step S20 and the like. In step S20, however, a configuration in which the difference value is "a difference value between the lowest voltage value and the next lowest voltage value (second lowest voltage value) next to this lowest voltage value" or the difference value is "a difference value between 'the next lowest voltage value' and the next lowest voltage value (third lowest voltage value) next to this 'next lowest voltage value'" may be employed. For example, in step S20, controller 400 may determine whether or not a difference value between voltage value V1 of first battery E1 and voltage value V2 of second battery E2 has become equal to or less than the first threshold value. Alternatively, in step S20, controller 400 may determine whether or not a difference value between voltage value V2 of second battery E2 and voltage value V3 of third battery E3 has become equal to or less than the first threshold value. Even when such configurations are employed, advantageous effects similar to those of the embodiment described above are produced.

(2) In the discharging process of the embodiment described above, the configuration in which the difference value is "a difference value between 'whole voltage value Vc' and 'the next highest voltage value'" has been described, as was mentioned in step S120 and the like. In step S120, however, a configuration in which the difference value is "a difference value between the highest voltage value and the next highest voltage value (second highest voltage value) next to this highest voltage value" or the difference value is "a difference value between 'the next highest voltage value' and the next highest voltage value (third highest voltage value) next to this 'next highest voltage value'" may be employed. For example, in step S120, controller 400 may determine whether or not a difference value between voltage value V3 of third battery E3 and voltage value V2 of second battery E2 has become equal to or less than the first threshold value. Alternatively, in step S120, controller 400 may determine whether or not a difference value between voltage value V2 of second battery E2 and voltage value V1 of first battery E1 has become equal to or less than the first threshold value. Even when such configurations are employed, advantageous effects similar to those of the embodiment described above are produced.

The battery system in the present embodiment also covers an assembled battery or a battery module implemented by a plurality of batteries connected in series, as well as a single battery, or a configuration having batteries connected in parallel.

Although the embodiment of the present invention has been described, it should be understood that the embodiment disclosed herein is illustrative and non-restrictive in every respect. The scope of the present invention is defined by the terms of the claims, and is intended to include any modifications within the meaning and scope equivalent to the terms of the claims.

What is claimed is:

1. A battery system comprising:
a charging apparatus;
a plurality of battery modules connectable in parallel with the charging apparatus; and
a controller, wherein
each of the plurality of battery modules has a battery, and
the controller
obtains, when a charging command is received, a voltage value of the battery of each of the plurality of battery modules, and identifies a first battery having a lowest voltage value and a second battery having a second lowest voltage value,
starts charging of the first battery, and
after starting the charging of the first battery, starts charging of the second battery when a difference value between a voltage value of a first battery module including the first battery and the voltage value of the second battery, or a difference value between the voltage value of the first battery and the voltage value of the second battery becomes equal to or less than a first threshold value, wherein
the plurality of battery modules include three battery modules, and
the controller
identifies, when the charging command is received, a third battery having a third lowest voltage value, along with the first battery and the second battery, and
after starting the charging of the second battery, starts charging of the third battery when a difference value between a voltage value of a second battery module including the second battery and the voltage value of the third battery, or a difference value between the voltage value of the second battery and the voltage value of the third battery becomes equal to or less than a second threshold value.

2. The battery system according to claim 1, wherein
when the charging command is received, and when the difference value is equal to or less than the first threshold value, the controller starts charging of the first battery and charging of the second battery.

3. The battery system according to claim 1, wherein
when the charging command is received, and when the difference value is greater than the first threshold value but is equal to or less than a third threshold value greater than the first threshold value, the controller starts charging of the first battery so as to linearly increase the voltage value of the first battery module or the voltage value of the first battery until elapse of a prescribed period of time since the reception of the charging command.

4. The battery system according to claim 1, wherein
when a number of batteries to be charged by the charging apparatus is equal to or less than a prescribed number, the controller limits a charging current by the controller.

5. The battery system according to claim 1, wherein
the first threshold value is calculated based on a resistance value of the first battery module, and a value of a current permitted to flow between the first battery module and a second battery module including the second battery.

6. The battery system according to claim 5, wherein
the resistance value is a combined value of an internal resistance value of the first battery and a resistance value of a component corresponding to the first battery.

7. A method for controlling a battery system including a charging apparatus and a plurality of battery modules connectable in parallel with the charging apparatus, each of the plurality of battery modules having a battery, the method comprising:
obtaining, when a charging command is received, a voltage value of the battery of each of the plurality of battery modules, the plurality of battery modules includes three battery modules, and identifying a first battery having a lowest voltage value and a second battery having a second lowest voltage value;
starting charging of the first battery; and
after starting the charging of the first battery, starting charging of the second battery when a difference value between a voltage value of a first battery module including the first battery and the voltage value of the second battery, or a difference value between the voltage value of the first battery and the voltage value of the second battery becomes equal to or less than a first threshold value;
identifying, when the charging command is received, a third battery having a third lowest voltage value, along with the first battery and the second battery, and
after starting the charging of the second battery, starting charging of the third battery when a difference value between a voltage value of a second battery module including the second battery and the voltage value of the third battery, or a difference value between the voltage value of the second battery and the voltage value of the third battery becomes equal to or less than a second threshold value.

* * * * *